(12) United States Patent
Masumoto

(10) Patent No.: US 10,078,906 B2
(45) Date of Patent: Sep. 18, 2018

(54) DEVICE AND METHOD FOR IMAGE REGISTRATION, AND NON-TRANSITORY RECORDING MEDIUM

(71) Applicant: FUJIFILM Corporation, Tokyo (JP)

(72) Inventor: Jun Masumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 15/455,887

(22) Filed: Mar. 10, 2017

(65) Prior Publication Data

US 2017/0270678 A1    Sep. 21, 2017

(30) Foreign Application Priority Data

Mar. 15, 2016   (JP) ................................ 2016-050425

(51) Int. Cl.
*G06K 9/00*    (2006.01)
*G06T 7/33*    (2017.01)
*G06T 19/00*   (2011.01)

(52) U.S. Cl.
CPC .............. *G06T 7/33* (2017.01); *G06T 19/006* (2013.01); *G06T 2207/10016* (2013.01);
(Continued)

(58) Field of Classification Search
CPC . G06T 2207/10016; G06T 2207/10028; G06T 2207/30056; G06T 2207/30096;
(Continued)

(56) References Cited

U.S. PATENT DOCUMENTS 8,606,045 B2 * 12/2013 Lee ...................... A61B 6/5247
                                                          382/294
8,811,718 B2 *  8/2014 Anai ..................... G01C 11/10
                                                          382/106
(Continued)

FOREIGN PATENT DOCUMENTS

JP      2007-257287 A    10/2007
JP       2010-14450 A     1/2010
(Continued)

OTHER PUBLICATIONS

Lindeberg, "Feature Detection with Automatic Scale Selection", Computational Vision and Active Perception Laboratory (CVAP) Department of Numerical Analysis and Computing Science KTH (Royal Institute of Technology) S-100 44 Stockholm, Sweden, Int. J. of Computer Vision, 1998, vol. 30, No. 2, total 53 pages.

*Primary Examiner* — Amara Abdi
(74) *Attorney, Agent, or Firm* — Birch, Stewart, Kolasch & Birch, LLP

(57) ABSTRACT

A second registration unit performs registration between an intraoperative live view obtained by an image obtaining unit and an associated image obtained by an associated image obtaining unit. At this time, the second registration unit extracts a plurality of feature points corresponding to one another from a registered intraoperative image registered with the associated image and a newly obtained intraoperative image, sets priority levels on the feature points corresponding to one another based on the associated image, obtains positional information indicating a relative positional difference between the registered intraoperative image and the newly obtained intraoperative image based on the feature points with the priority levels set thereon, and performs registration between the associated image and the newly obtained intraoperative image based on the positional information.

13 Claims, 6 Drawing Sheets

(52) U.S. Cl.
CPC ............... *G06T 2207/10028* (2013.01); *G06T 2207/30056* (2013.01); *G06T 2207/30096* (2013.01); *G06T 2207/30101* (2013.01); *G06T 2210/41* (2013.01)

(58) Field of Classification Search
CPC ......... G06T 2207/30101; G06T 19/006; G06T 2210/41; G06T 7/33
See application file for complete search history.

(56) References Cited

U.S. PATENT DOCUMENTS

| | | | | |
|---|---|---|---|---|
| 2009/0135269 | A1* | 5/2009 | Nozaki | G06K 9/00221 348/222.1 |
| 2009/0245692 | A1 | 10/2009 | Okutomi et al. | |
| 2010/0177163 | A1* | 7/2010 | Yang | G06T 15/02 348/45 |
| 2012/0253170 | A1* | 10/2012 | Kim | A61B 34/10 600/410 |
| 2013/0212506 | A1* | 8/2013 | Aoshima | G06F 3/04845 715/765 |
| 2013/0274596 | A1* | 10/2013 | Azizian | A61B 5/0071 600/424 |
| 2015/0051617 | A1* | 2/2015 | Takemura | A61B 6/12 606/130 |

FOREIGN PATENT DOCUMENTS

| | | | | |
|---|---|---|---|---|
| JP | 2010-200894 | * | 9/2010 | ............. A61B 19/00 |
| JP | 2010-200894 | A | 9/2010 | |
| JP | 2010-532035 | A | 9/2010 | |
| JP | 2010-259497 | A | 11/2010 | |
| JP | 2010259497 | * | 11/2010 | ............. A61B 19/00 |
| JP | 2013-20313 | A | 10/2013 | |
| JP | 2015-523102 | A | 8/2015 | |

\* cited by examiner

DEVICE AND METHOD FOR IMAGE REGISTRATION, AND NON-TRANSITORY RECORDING MEDIUM

CROSS-REFERENCE TO RELATED APPLICATIONS

The present application claims priority under 35 U.S.C. § 119 to Japanese Patent Application No. 2016-050425, filed on Mar. 15, 2016. The above application is hereby expressly incorporated by reference, in its entirety, into the present application.

BACKGROUND

The present disclosure relates to an image registration device, an image registration method, and an image registration program for performing registration between a live view and an associated image associated with surgery of a surgical site.

In recent years, surgery simulation using three-dimensional medical images is becoming popular. The surgery simulation refers to simulation of an actual surgical procedure with visualizing a tissue or an organ, which is the objects of the surgery, and surrounding structures thereof from medical images. For example, with simulation of partial resection of the liver, tissues, such as the liver, the portal vein, veins, arteries, the body surface, bones, and a tumor, are extracted from a tomographic image, such as a CT (Computed Tomography) image or an MRI (Magnetic Resonance Imaging) image, and a three-dimensional image visualizing the extracted tissues is generated. This images is used to make a surgical plan by, for example, calculating, with a computer, an area to be resected of the liver region including a tumor in the liver, for example.

On the other hand, there is a demand for viewing such an image used for the surgery simulation (which will hereinafter be referred to as "simulation image"), as described above, as a reference during surgery. For this reason, such a simulation image may be printed on paper and brought in the surgery room, or may be displayed on a display device installed in the surgery room. Then, the surgeon conducts the surgery with looking at the actual surgical site of the patient, and the simulation image printed on paper or displayed on the display device for confirmation.

It is, however, very troublesome to conduct surgery with alternately looking at the patient and the simulation image, and there is a demand for displaying a simulation image superimposed on an image of the actual object of the surgery. To meet this demand, some approaches have been proposed for obtaining a live view formed by a plurality of images by imaging the surgical site during surgery, and displaying a simulation image superimposed on the live view. For example, Japanese Unexamined Patent Publication No. 2013-202313 (hereinafter, Patent Document 1) proposes an approach which involves attaching an optical sensor or a magnetic sensor to a camera for imaging the surgical site, to a surgical tool, or directly to an organ and performing calibration, i.e., initial registration, of the relative positional relationship among them, and moving a simulation image relative to change of the position and orientation of the camera and movement of the organ after the initial registration, to thereby display the simulation image that is registered with and superimposed on the view of the surgical site.

Also, an approach which involves placing a marker on a surgical site, detecting the position of the marker with a sensor to register a simulation image with a live view of the surgical site, and displaying the simulation image on a head-mount display (see Japanese Unexamined Patent Publication No. 2010-259497 (hereinafter, Patent Document 2), and an approach which involves embedding a marker in a surgical site, detecting the marker with a sensor to register a simulation image with the surgical site, and displaying the simulation image registered with the surgical site on a monitor (see Japanese Unexamined Patent Publication No. 2010-200894 (hereinafter, Patent Document 3) have been proposed.

On the other hand, approaches where registration between a live view of a patient obtained by imaging and a simulation image is performed without using a sensor, or the like, have been proposed. For example, PCT Japanese Publication No. 2015-523102 (hereinafter, Patent Document 4) proposes an approach which involves generating a model of an organ from a three-dimensional image, and calculating an affine transformation function between the model of the organ and each frame of an ultrasonic image to display the model of the organ superimposed on the ultrasonic image real-time, and superimposing the model of the organ on the ultrasonic image by transforming the model of the organ based on the affine transformation function. Further, PCT Japanese Publication No. 2010-532035 (hereinafter, Patent Document 5) proposes an approach for superimposing a simulation image on a stereoscopic live view, where the simulation image is superimposed on a taken image using the parallax of the taken live view.

Further, in order to achieve registration between the taken live view and the simulation image, it is necessary to perform registration between time series images forming the taken live view. In order to achieve accurate registration, it is necessary to determine appropriate feature points used in the registration. For this purpose, an approach is proposed, which involves detecting feature points in two images obtained in time series included in the live view, and detecting movement of the imaging device by calculating movement of each of feature points that are selected based on the directions of loci, amounts of loci, distribution, etc., of the feature points (see Japanese Unexamined Patent Publication No. 2010-14450 (hereinafter, Patent Document 6)). Also, an approach is proposed, which involves setting a region of interest on first one of two images obtained in time series included in the live view, determining an area on the obtained images from which feature points usable for registration of the region of interest can be extracted, and performing registration between the two images using the feature points determined within the area (see Japanese Unexamined Patent Publication No. 2007-257287 (hereinafter, Patent Document 7)). The approaches taught in Patent Documents 6 and 7 allow selecting appropriate feature points used in registration between two images, thereby allowing accurate registration between two images.

SUMMARY

The approaches taught in Patent Documents 6 and 7, however, take only registration between two images into account, and they do not work well for selecting feature points that allow appropriate registration between an intraoperative live view obtained during surgery and an associated image, such as a simulation image. Thus, the approaches taught in Patent Documents 6 and 7 may fail to achieve accurate registration between the intraoperative live view and the associated image.

In view of the above-described circumstances, the present disclosure is directed to achieve accurate registration between an intraoperative live view capturing a surgical site and an associated image associated with surgery of the surgical site.

An aspect of the image registration device according to the disclosure comprises:

an image obtaining unit configured to obtain an intraoperative live view comprising two or more intraoperative images taken at different times, the intraoperative live view capturing a surgical site in a human body undergoing a surgery;

an associated image obtaining unit configured to obtain an associated image associated with the surgery of the surgical site; and a registration unit configured to perform registration between the intraoperative live view and the associated image, wherein the registration unit extracts a plurality of feature points corresponding to one another from a registered intraoperative image having been registered with the associated image and a newly obtained intraoperative image, sets priority levels on the feature points corresponding to one another based on the associated image, obtains positional information indicating a relative positional difference between the registered intraoperative image and the newly obtained intraoperative image based on the feature points with the priority levels set thereon, and performs registration between the associated image and the newly obtained intraoperative image based on the positional information.

The term "associated image" as used herein refers to any image associated with the surgical site captured in the intraoperative live view. Examples of an image usable as the associated image include an image representing the three-dimensional shape of the surgical site generated from a CT image or an MRI image, an image representing the three-dimensional shapes of the surgical site and structures included in the surgical site generated from a CT image or an MRI image, a symbol, such as a line or an arrow, indicating a resection position of the surgical site determined on an image representing the three-dimensional shape of a structure (i.e., a surgery simulation image), or a functional three-dimensional image obtained through PET (Positron Emission Tomography) scanning or NM (Nuclear Medical) scanning.

The image registration device according to the disclosure may further comprise a display control unit configured to superimpose the associated image on the intraoperative live view and display the associated image superimposed on the intraoperative live view on a display unit during the registration.

In the image registration device according to the disclosure, the registration unit may weight each of the feature points corresponding to one another according to the priority level, select, from the feature points corresponding to one another, a certain number of feature points used to obtain the positional information, and obtain the positional information based on the selected certain number of feature points.

In the image registration device according to the disclosure, the priority level may be set on each position on the associated image, and the registration unit may set priority levels on the feature points corresponding to one another with referencing the priority levels on the associated image.

In this case, a higher priority level may be set on a more characteristic position of the surgical site on the associated image.

The "characteristic position" as used herein refers to a characteristic position suitable for use in the registration. As the characteristic position, a contour of the surgical site in the associated image, a line representing a resection position that has been set during simulation, and a position, such as the position of a lesion, which is distinguishable from other sites, for example, can be used.

In the image registration device according to the disclosure, if the associated image includes a line representing a resection position of the surgical site, a higher priority level may be set on a position in the vicinity of the line.

In the image registration device according to the disclosure, if the associated image includes a line representing a resection position of the surgical site, a higher priority level may be set on a position that will be left after resection along the line.

The image registration device according to the disclosure may further comprise an initial registration unit configured to perform initial registration between the intraoperative live view and the associated image, wherein the registration unit may perform the registration based on the result of the initial registration.

In this case, the registration unit may perform the registration between the intraoperative image used in the initial registration and the newly obtained intraoperative image every time a certain number of the intraoperative images have been obtained.

In this case, the registration unit may use the intraoperative image used in the initial registration as the registered intraoperative image.

In the image registration device according to the disclosure, the associated image may comprise an image representing a three-dimensional shape of the surgical site.

An aspect of the image registration method according to the disclosure comprises the steps of:

obtaining an intraoperative live view comprising two or more intraoperative images taken at different times, the intraoperative live view capturing a surgical site in a human body undergoing a surgery;

obtaining an associated image associated with the surgery of the surgical site; and performing registration between the intraoperative live view and the associated image, the performing registration comprising:

extracting a plurality of feature points corresponding to one another from a registered intraoperative image having been registered with the associated image and a newly obtained intraoperative image, setting priority levels on the feature points corresponding to one another based on the associated image, obtaining positional information indicating a relative positional difference between the registered intraoperative image and the newly obtained intraoperative image based on the feature points with the priority levels set thereon, and performing registration between the associated image and the newly obtained intraoperative image based on the positional information.

It should be noted that the image registration method according to the disclosure may be provided in the form of a program for causing a computer to execute the image registration method.

According to the disclosure, a plurality of feature points corresponding to one another are extracted from a registered intraoperative image having been registered with an associated image and a newly obtained intraoperative image, priority levels are set on the feature points corresponding to one another based on the associated image, positional information indicating a relative positional difference between the registered intraoperative image and the newly obtained intraoperative image is obtained based on the feature points with the priority levels set thereon, and registration between the associated image and the newly obtained intraoperative image is performed based on the positional information. Assigning the feature points with priority levels based on the associated image in this manner allows obtaining the positional information using feature points having higher priority levels that are set based on the associated image. Using the thus obtained positional information allows accurate registration between the registered intraoperative image and the newly obtained intraoperative image, and in turn, accurate registration between the associated image and the newly obtained intraoperative image.

DETAILED DESCRIPTION OF THE PREFERRED EMBODIMENTS

Figure 1:
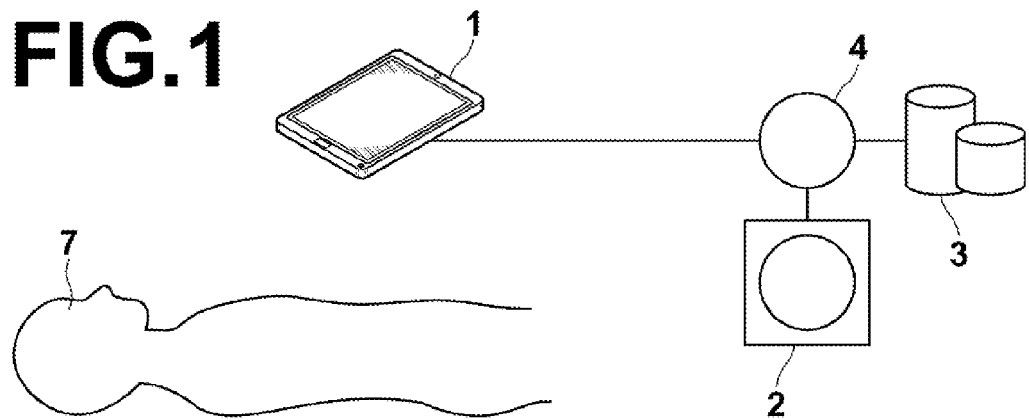
FIG. 1 is a diagram illustrating the hardware configuration showing the outline of a surgery assisting system to which an image registration device according to a first embodiment of the disclosure is applied.

Hereinafter, embodiments of the present disclosure will be described with reference to the drawings. FIG. 1 is a diagram illustrating the hardware configuration showing the outline of a surgery assisting system to which an image registration device according to an embodiment of the disclosure is applied. As shown in FIG. 1, in this system, an image registration device 1 according to this embodiment, a three-dimensional imaging apparatus 2, and an image repository server 3 are connected to one another via a network 4 such that they can communicate with one another.

The three-dimensional imaging apparatus 2 images a surgical site of a subject 7 to generate a three-dimensional image V0 representing the surgical site, and specific examples thereof include a CT apparatus, an MRI apparatus, and a PET apparatus. The three-dimensional image V0 generated by the three-dimensional imaging apparatus 2 is sent to and stored in the image repository server 3. It should be noted that, in this embodiment, it is assumed that the surgical site of the subject 7 is the liver, the three-dimensional imaging apparatus 2 is a CT apparatus, and the three-dimensional image V0 of the abdomen of the subject 7 is generated.

The image repository server 3 is a computer that stores and manages various data, and includes a high-capacity external storage device and a database management software. The image repository server 3 communicates with the other components of the system via the network 4, which is a wired or wireless network, to send and receive image data, etc. Specifically, the image data, such as the three-dimensional image V0 generated by the three-dimensional imaging apparatus 2, is obtained via the network, and is stored and managed in a storage medium, such as the high-capacity external storage device. It should be noted that the format of the stored image data and communication among the components of the system via the network 4 are based on a protocol, such as DICOM (Digital Imaging and COmmunication in Medicine).

The image registration device 1 is implemented by installing an image registration program of the disclosure on a single computer. In this embodiment, the computer is a tablet terminal that is wirelessly connected to the network 4 and is directly operated by the surgeon, who is the operator of the image registration device. The image registration program is distributed with being recorded on a storage medium, such as a DVD (Digital Versatile Disc) or CD-ROM (Compact Disc Read Only Memory), and is installed on the tablet terminal from the storage medium. Alternatively, the image registration program may be stored in a storage device of a server computer connected to the network, or a network storage, such that it is externally accessible, and may be downloaded and installed on the tablet terminal per request.

Figure 2:
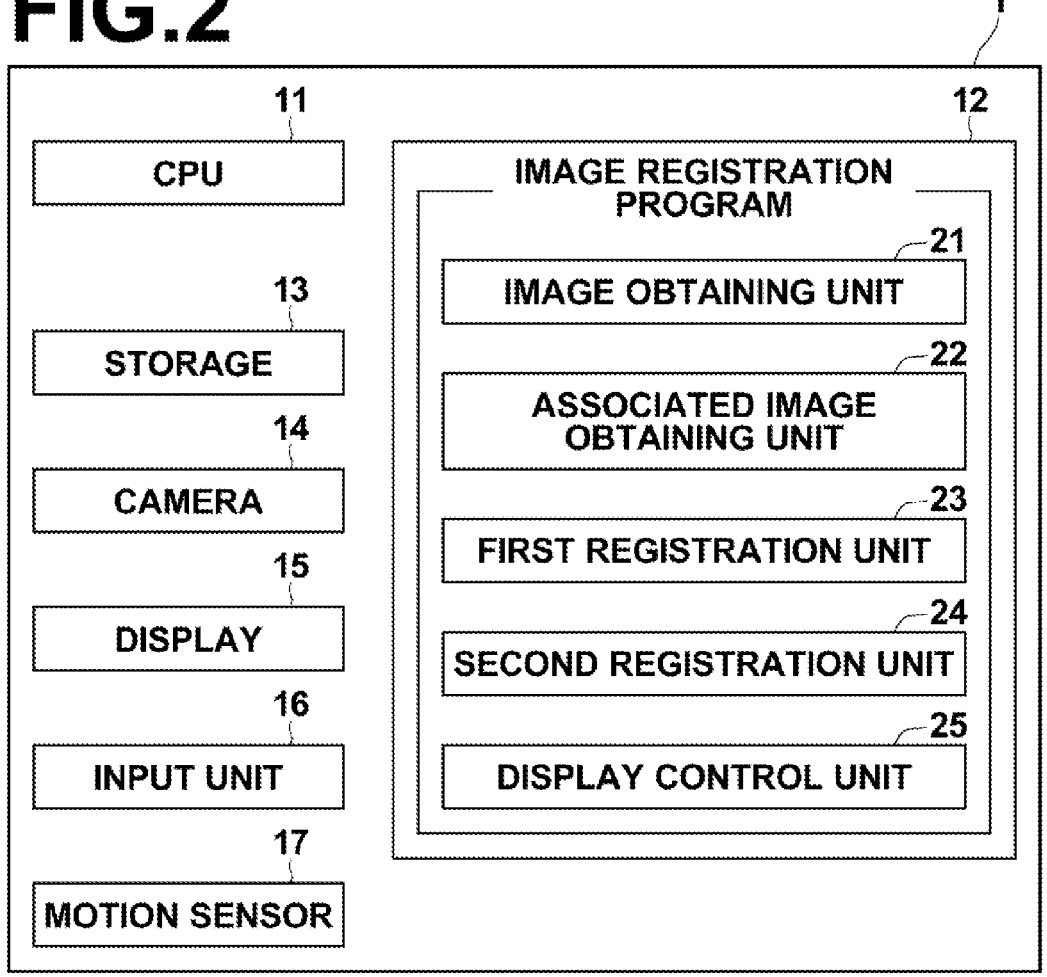
FIG. 2 is a diagram illustrating the schematic configuration of the image registration device according to the first embodiment implemented by installing an image registration program on a tablet terminal.

FIG. 2 is a diagram illustrating the schematic configuration of the image registration device implemented by installing the image registration program on the tablet terminal. As shown in FIG. 2, the image registration device 1 includes, as the configuration of a standard tablet terminal, a CPU (Central Processing Unit) 11, a memory 12, a storage 13, a camera 14, a display 15, such as a liquid crystal display, a touch-panel input unit 16, and a motion sensor 17.

The storage 13 stores the three-dimensional image V0 obtained from the image repository server 3 via the network 4, and various information including images generated by operation of the image registration device 1.

The camera 14 includes a lens, an image sensor, such as a CCD (Charge Coupled Device), and an image processing unit, etc., for processing the obtained image to improve the image quality. The surgeon images the liver, which is the surgical site of the subject 7 undergoing surgery, of the subject 7 having been subjected to laparotomy using the camera 14 of the image registration device 1, i.e., the tablet terminal, to obtain an intraoperative live view L0, which is formed by two or more intraoperative images taken at different times, capturing the liver during the surgery. It should be noted that, in this embodiment, the liver corresponds to the surgical site. The intraoperative live view L0 is a moving image formed by sequential intraoperative images at a frame rate, such as 30 fps.

The motion sensor 17 is a nine-axis motion sensor that detects acceleration along three axes, i.e., the x-axis, the y-axis, and the z-axis, angular speed along the three axes, and inclination along the three axes relative to the position of the tablet terminal. Thus, the motion sensor 17 detects movement of the tablet terminal, i.e., movement of the camera 14. The acceleration, the angular speed, and the inclination detected by the motion sensor 17 are outputted as movement information to the CPU 11 and are used as necessary.

The memory 12 stores the image registration program. The image registration program prescribes, as operations to be executed by the CPU 11: an image obtaining operation to obtain the intraoperative live view L0 formed by two or more intraoperative images taken at different times and capturing a surgical site of a human body undergoing a surgery, and the three-dimensional image V0; an associated image obtaining operation to obtain an associated image S0 associated with hepatic surgery; a first registration operation to perform first registration, which is the initial registration, between the liver captured in the intraoperative live view L0 and the associated image S0; a second registration operation to perform second registration between the liver captured in the intraoperative live view L0 and the associated image S0 based on the result of the first registration; and a display control operation to superimpose and display the associated image S0 on the liver captured in the intraoperative live view L0 during the second registration. It should be noted that the second registration operation includes: extracting a plurality of feature points corresponding to one another from the registered intraoperative image having been registered with the associated image S0 and a newly obtained intraoperative image; setting priority levels on the feature points corresponding to one another based on the associated image; obtaining positional information indicating a relative positional difference between the registered intraoperative image and the newly obtained intraoperative image based on the feature points with the priority levels set thereon; and performing registration between the associated image S0 and the newly obtained intraoperative image based on the positional information.

When the CPU 11 executes these operations according to the program, the tablet terminal functions as an image obtaining unit 21, an associated image obtaining unit 22, a first registration unit 23, a second registration unit 24, and a display control unit 25. It should be noted that the image registration device 1 may include different processors for executing the image obtaining operation, the associated image obtaining operation, the first registration operation, the second registration operation, and the display control operation, respectively. It should be noted that the first registration unit 23 corresponds to an initial registration unit, and the second registration unit 24 corresponds to a registration unit.

The image obtaining unit 21 obtains the three-dimensional image V0, and the intraoperative live view L0 capturing the objective site of the subject 7 undergoing surgery, which is imaged with the camera 14. In the case where the three-dimensional image V0 has already been stored in the storage 13, the image obtaining unit 21 may obtain the three-dimensional image V0 from the storage 13. It should be noted that, in this embodiment, the intraoperative live view L0 is obtained by the surgeon by imaging, from above, the liver of the subject 7 having been subjected to laparotomy.

The associated image obtaining unit 22 generates a surgery simulation image of the liver as the associated image S0. For this purpose, the associated image obtaining unit 22 first extracts, from the three-dimensional image V0, the liver, and the hepatic artery, the hepatic vein, and a lesion included in the liver. The associated image obtaining unit 22 includes a classifier for classifying each pixel of the three-dimensional image V0 into pixels representing the liver, and the artery, the vein, and the lesion included in the liver (which will hereinafter be referred to as "the liver, and the like") and other pixels. The classifier is obtained through machine learning using a plurality of sample images of the liver, and the like, based on a technique, such as the Ada-Boosting algorithm. The associated image obtaining unit 22 extracts the liver, and the like, from the three-dimensional image V0 using the classifier.

Then, the associated image obtaining unit 22 generates an image representing the three-dimensional shapes of the liver, and the like, as the associated image S0. Specifically, a projection image of the extracted liver, and the like, projected on a predetermined projection plane is generated as the associated image S0. The projection plane may, for example, be a plane directly facing the liver of the subject 7. It should be noted that, as a specific projection method, a known technique, such as volume rendering, is used.

Figure 3:
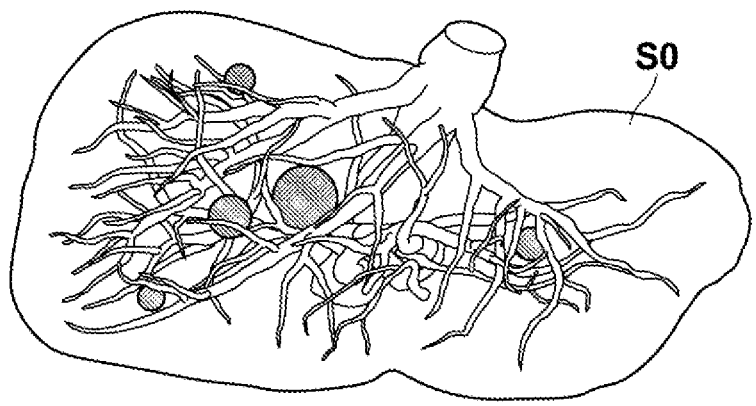
FIG. 3 is a diagram illustrating an associated image.

At this time, the associated image S0 may be generated with defining different colors or different transparency values for the liver, and the hepatic artery, the hepatic vein, and the lesion included in the liver. For example, the hepatic artery may be shown in red, the hepatic vein may be shown in blue, and the lesion may be shown in green, and/or the liver may be shown with an opacity value of 0.1, the hepatic artery and the hepatic vein may be shown with an opacity value of 0.5, and the lesion may be shown with an opacity value of 0.8. In this manner, the associated image S0, as shown in FIG. 3, is generated. Defining different colors or different transparency values for the liver, and the hepatic artery, the hepatic vein, and the lesion included in the liver in the associated image S0 facilitates identifying the liver, and the hepatic artery, the hepatic vein, and the lesion included in the liver. It should be noted that both different colors and different transparency values may be defined to generate the associated image S0. Further, a line indicating an area to be resected set by simulation, i.e., a resection line, may be added to the associated image S0. The thus generated associated image S0 is stored in the storage 13.

Figure 4:
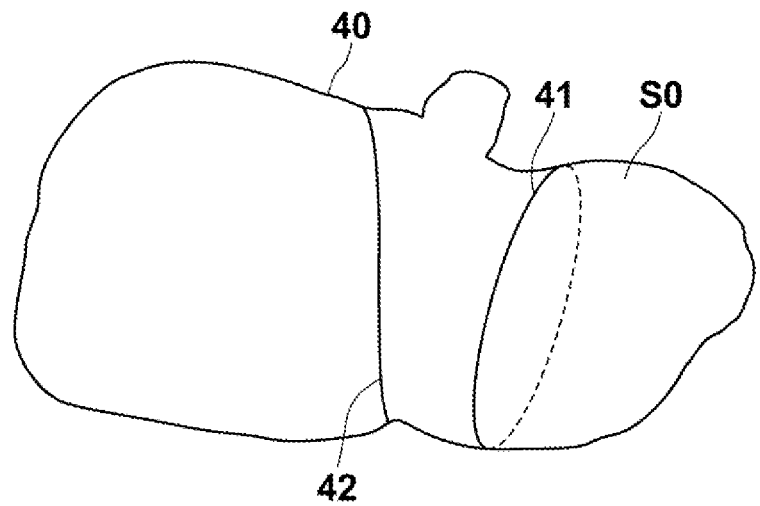
FIG. 4 is a diagram for explaining how priority levels are set.

It should be noted that a priority level is set on each position of the associated image S0. The priority levels may be set on all the pixel positions of the associated image, or pixel positions decimated to several pixel interval. The priority levels may be set by the surgeon via the input unit 16 while viewing the associated image S0 displayed on the display unit 15, or may be set automatically. FIG. 4 is a diagram for explaining how the priority levels are set. It should be noted that the hepatic artery, the hepatic vein, and a lesion in the liver are omitted in the associated image S0 shown in FIG. 4, and the associated image S0 includes a contour 40 of the liver, a resection line 41 along which is resection is conducted during the surgery, and a boundary 42 of an area that appears on the surface of the liver. The priority levels are assigned such that a higher priority level is assigned to a pixel position that is more characteristic to the associated image S0 and more suitable for use in the registration. For example, higher priority levels are set on pixel positions on the contour 40 of the liver, the resection line 41, and the boundary 42 of the area that appears on the surface of the liver. In this case, lower priority levels are set on pixel positions that are farther from the contour 40 of the liver, the resection line 41, and the boundary 42 of the area that appears on the surface of the liver. Further, higher priority levels are assigned on pixel positions on the area of the liver that will be left after the resection along the resection line 41, i.e., the left side area of the liver shown in FIG. 4, than pixel positions on the area of the liver that will be resected, i.e., the right side area of the liver shown in FIG. 4. It should be noted that, in this embodiment, the priority levels may be set to have a value between 0 and 1, for example, where a higher value indicates a higher priority level.

Now, a process performed in the first embodiment is described along with description of the first and second registration units 23 and 24, and the display control unit 25.

Figure 5:
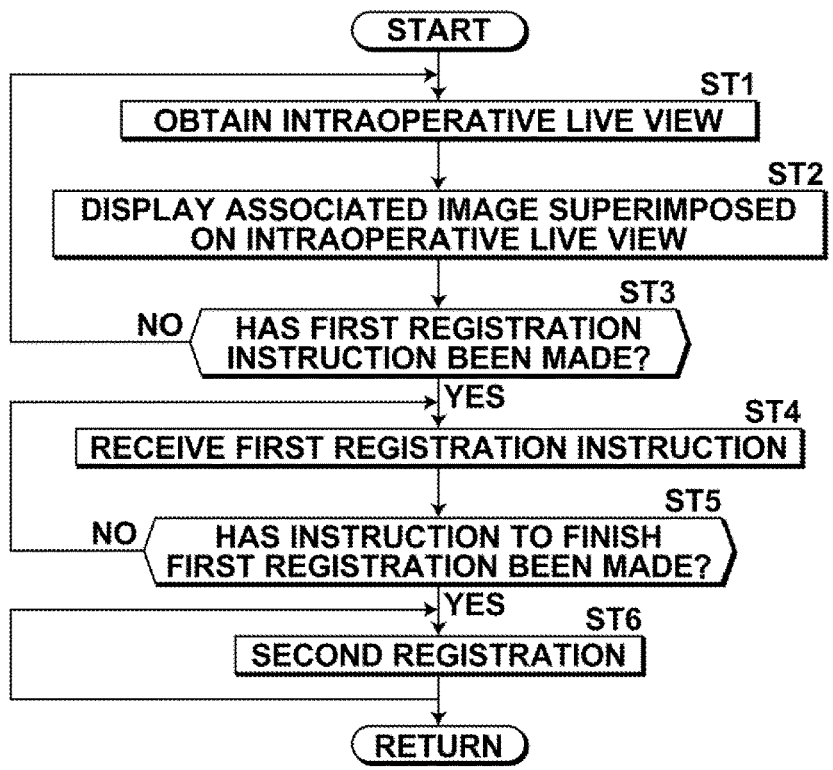
FIG. 5 is a flow chart showing a process performed in the first embodiment.

FIG. 5 is a flow chart showing the process performed in the first embodiment. It is assumed that the associated image S0 has already been generated and stored in the storage 13 with the priority levels set thereon. First, the liver of the subject 7 is imaged to obtain an intraoperative live view L0 (step ST1). Then, the display control unit 25 displays, on the display 15, the associated image S0 superimposed on the intraoperative live view L0 (step ST2). It should be noted that, at this stage, the associated image S0 is displayed at a predetermined position on the display 15.

Subsequently, the first registration unit 23 begins monitoring to determine whether or not a first registration instruction has been made (step ST3). If the determination in step ST3 is affirmative, the first registration unit 23 receives the first registration instruction made by the surgeon (step ST4). In response to the first registration instruction, the first registration unit 23 performs the first registration, which is the initial registration.

Figure 6:
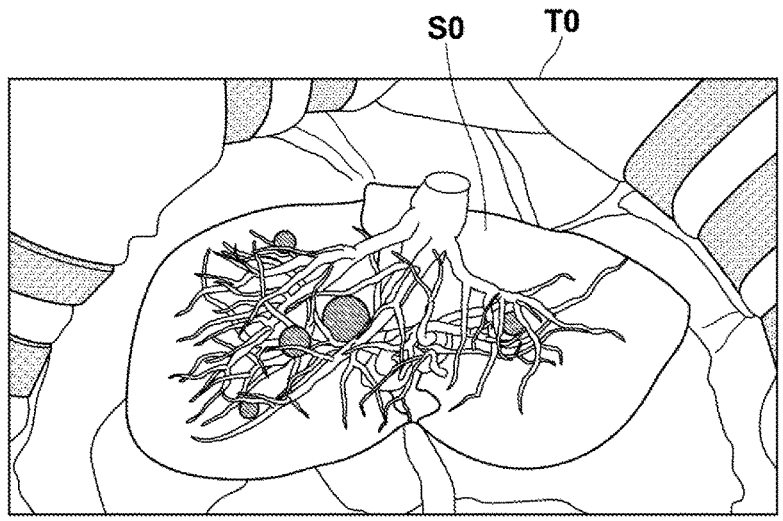
FIG. 6 is a diagram representing an image displayed on a display unit during first registration.

FIG. 6 is a diagram illustrating an image displayed on the display 15 during the first registration. The associated image S0, which is displayed as described above, is ready for translation, rotation, and scaling according to operation of the input unit 16, i.e., touch operation made on the display 15. Assuming that the x-axis and the y-axis are set along the display surface of the display 15 and the z-axis is set along the direction perpendicular to the display surface, rotation can be performed in any direction about the three axes. It should be noted that the rotation as used herein refers to rotation about the z-axis. When the associated image S0 is rotated about an axis other than the z-axis, i.e., is rotated about at least one of the x-axis and the y-axis, the orientation of the associated image S0 is changed. The rotation of the associated image S0 about at least one of the x-axis and y-axis is defined herein as change of the orientation.

It should be noted that the intraoperative live view L0 displayed during the first registration may be either of a moving image or a still image, and it is assumed to be a still image in this embodiment. Further, it is preferred to adjust the position of the tablet terminal during the initial registration such that the intraoperative live view L0 captures the entire (if possible) surgical field.

When the orientation of the associated image S0 is changed, the projection plane of the associated image S0 is changed. Accordingly, when the orientation of the associated image S0 is changed and the projection plane is changed, the associated image obtaining unit 22 generates the associated image S0 again.

The surgeon performs translation, rotation, and scaling of the associated image S0 while viewing the intraoperative live view L0 and the associated image S0 displayed on the display 15 such that the position of the associated image S0 is aligned with the position of the liver captured in the intraoperative live view L0. Further, the surgeon may change the orientation of the associated image S0, if necessary. At this time, the transparency of the associated image S0 may also be changed. The transparency of the associated image S0 may be changed in response to an instruction inputted via the input unit 16, or the transparency may be changed when the surgeon makes touch operation on the display 15 for the first registration.

Then, when alignment between the position of the associated image S0 and the position of the liver captured in the intraoperative live view L0 is achieved, an instruction to finish the first registration is made via the input unit 16, and the first registration ends. It should be noted that the instruction to finish the first registration may be made via a button displayed on the display 15 to be operated via the input unit 16, or by making a predetermined operation, such as double tap. Then, an intraoperative image which is one frame of the intraoperative live view L0 displayed on the display 15 at the end of the first registration is stored as an initial intraoperative image T0 in the storage 13.

Then, the first registration unit 23 determines whether or not an instruction to finish the first registration has been made (step ST5). It should be noted that the operation in step ST5 may be performed by the second registration unit 24. If the determination in step ST5 is negative, the process returns to step ST4, and reception of the first registration instruction is continued. If the determination in step ST5 is affirmative, the second registration unit 24 performs the second registration (step ST6).

In this embodiment, the intraoperative images are sequentially obtained with the camera 14 to form the intraoperative live view L0. The second registration unit 24 performs registration between the sequentially obtained intraoperative images and the associated image S0. Specifically, the second registration unit 24 obtains, from each of the registered intraoperative images having been registered with the associated image S0 and a newly obtained intraoperative image, positional information indicating a relative positional difference between the registered intraoperative image and the newly obtained intraoperative image, and performs the registration between the associated image S0 and the newly obtained intraoperative image based on the positional information. It should be noted that the registered intraoperative images includes the initial intraoperative image T0.

Figure 7:
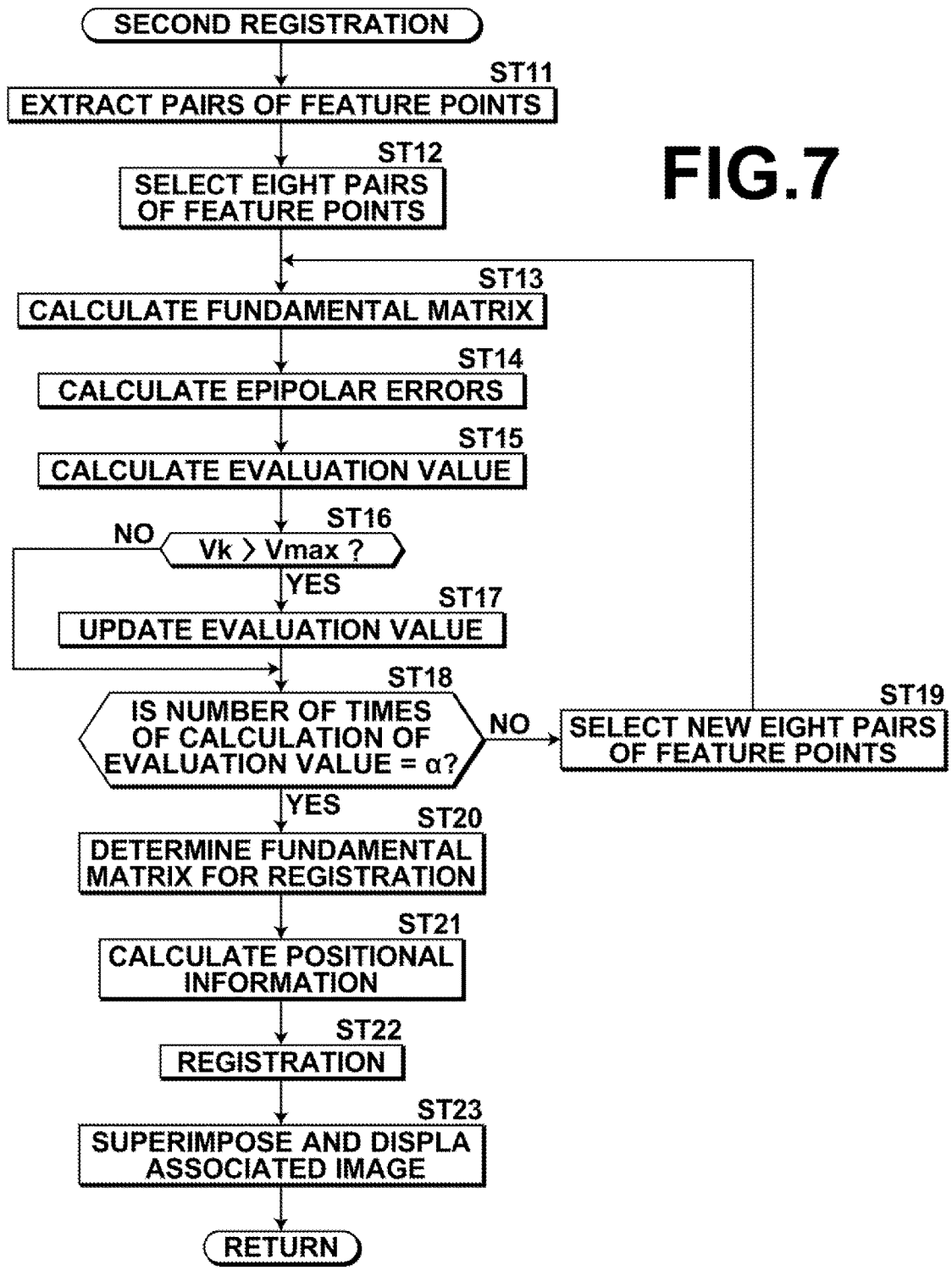
FIG. 7 is a flow chart showing operations performed in second registration.
Figure 8:
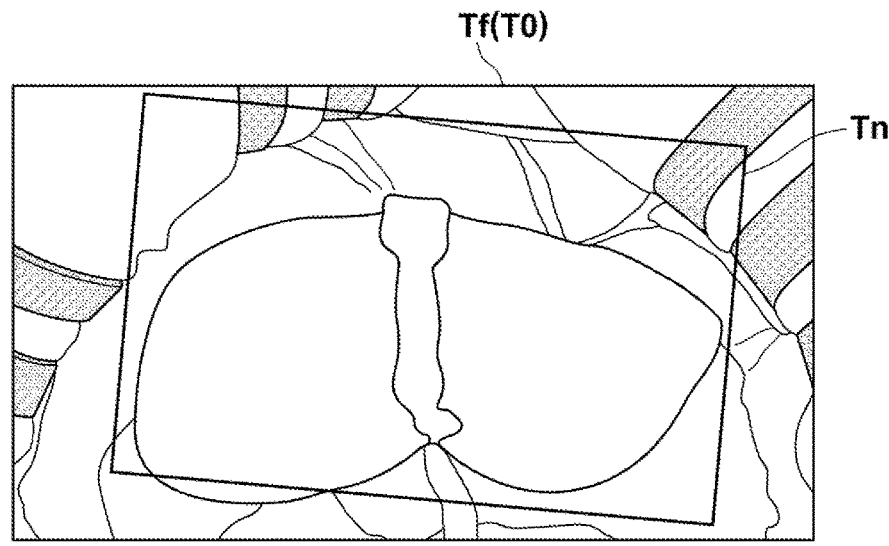
FIG. 8 is a diagram for explaining a positional difference of a newly obtained intraoperative image relative to a registered intraoperative image.

FIG. 7 is a flow chart showing operations performed in the second registration. After the first registration, the surgeon proceeds with the surgery. During the surgery, the surgeon cannot always hold the tablet terminal above the subject 7, and imaging of the objective site with the tablet terminal is temporarily stopped. Thereafter, imaging of the liver, which is the object, with the tablet terminal is performed when it is necessary, such as for confirming the position of the lesion. At this time, imaging of the liver is performed again with the position of the tablet terminal being moved from the position where the first registration has been performed. In such a situation, the position of the camera 14 is different from the position thereof where the registered intraoperative image has been taken, and the position of a newly obtained intraoperative image Tn is different from the position of the registered intraoperative image Tf, as shown in FIG. 8. Further, even in a case where the tablet terminal is held above the subject 7, the tablet terminal is moved as long as it is held by a hand, and the position of the newly obtained intraoperative image Tn is shifted from the position of the registered intraoperative image Tn.

The operation performed by the second registration unit 24 involves: extracting feature points corresponding to one another from the intraoperative images Tf and Tn; calculating a fundamental matrix using the RANSAC (RANdam SAmple Consensus) technique; obtaining the positional information by estimating changes of position and the posture of the camera 14, i.e., the tablet terminal, used to image the intraoperative images Tf and Tn based on the fundamental matrix; and performing the second registration, which is registration between the associated image S0 and the intraoperative image Tn, using the positional information.

Thus, the second registration unit 24 extracts pairs of feature points, which are feature points corresponding to one another, from the intraoperative images Tf and Tn used in the second registration (step ST11). In the extraction of the pair of feature points, pairs of feature points at corresponding pixel positions on the contour of the liver and the boundary of the area that appears on the surface of the of the liver captured in the intraoperative images Tf and Tn are extracted using, for example, a technique taught in T. Lindeberg, "Feature Detection with Automatic Scale Selection", Computational Vision and Active Perception Laboratory (CVAP) Department of Numerical Analysis and Computing Science KTH (Royal Institute of Technology) S-100 44 Stockholm, Sweden. Int. J. of Computer Vision, vol. 30, No. 2, 1998 (In press). It should be noted that the method used to extract the pairs of feature points is not limited to the above-described method, and any of known techniques, such as template matching, can be used. In this example, the pairs of feature points corresponding to one another are defined as (pfi, pni)=((xfi, yfi), (xni, yni)) (where i=1 to M, where M is the number of the pairs of feature points).

Figure 9:
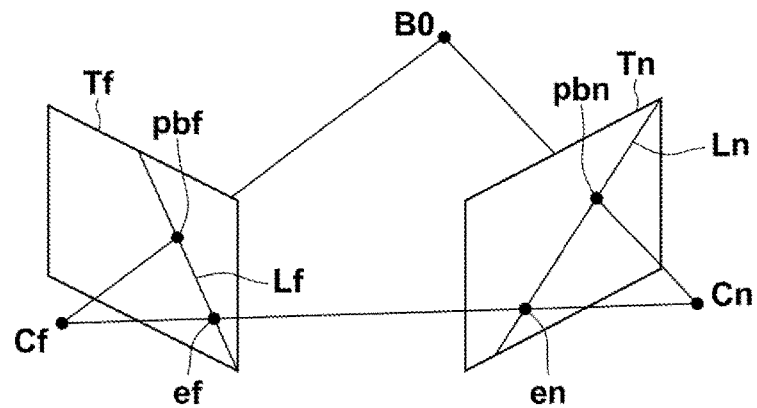
FIG. 9 is a diagram for explaining epipolar geometry.

Then, the second registration unit 24 repeats the calculation of the fundamental matrix based on epipolar geometry by predetermined number of times. Now, the epipolar geometry is described. FIG. 9 is a diagram for explaining the epipolar geometry. As shown in FIG. 9, is it assumed that a point B0 in a space has been imaged with the camera 14 from different positions to obtain an intraoperative image Tf and an intraoperative image Tn. It should be noted that points Cf and Cn shown in FIG. 9 are principal points of the camera 14 when the intraoperative images Tf and Tn are taken. A point on the intraoperative image Tf where a point B0 is captured is denoted by "pbf". A point on the intraoperative image Tn where a point B0 is captured is denoted by "pbn". A point of intersection between a straight line connecting the point Cf and point Cn and the intraoperative image Tf is referred to as a first epipole ef, and a point of intersection between a straight line connecting the point Cp and the point Cs and the intraoperative image Tn is referred to as a second epipole en. Further, a line of intersection between a plane containing the point B0, the point Cf, and the point Cn and the intraoperative image Tf is referred to as a first epipolar line Lf, and line of intersection between the above plane and the intraoperative image Tn is referred to as a second epipolar line Ln. The epipolar line Lf is expressed as: $a_{fi}x+b_{fi}y+c_{fi}=0$, and the epipolar line Ln is expressed as: $a_{ni}x+b_{ni}y+c_{ni}=0$.

A governing equation in the epipolar geometry is an epipolar equation. The fundamental matrix is a 3×3 matrix, which is represented by F, and the epipolar equation is expressed by the equation (1) below:

$$(x_{ni}, y_{ni}, 1)F \begin{pmatrix} x_{fi} \\ y_{fi} \\ 1 \end{pmatrix} = 0. \tag{1}$$

The second registration unit 24 calculates the fundamental matrix F by solving the epipolar equation using pairs of feature points for eight points according to the known eight-point algorithm, and repeats the calculation of the fundamental matrix F until the optimal pairs of feature points for the eight points are calculated. For this purpose, the second registration unit 24 selects eight pairs of feature points for solving the epipolar equation from pairs of feature points (step ST12), and solves the epipolar equation using the selected eight pairs of feature points to calculate the fundamental matrix F (step ST13). After the calculation of the fundamental matrix F, the second registration unit 24 calculates vectors $(a_{fi},b_{fi},c_{fi})$ and $(a_{ni},b_{ni},c_{ni})$ defining the epipolar lines Lf and Ln, according to the equations (2) and (3) below:

$$(a_{fi},b_{fi},c_{fi})=(x_{fi},y_{fi},1)F^T \tag{2},$$

$$(a_{ni},b_{ni},c_{ni})=(x_{ni},y_{ni},1)F \tag{3}.$$

Figure 10:
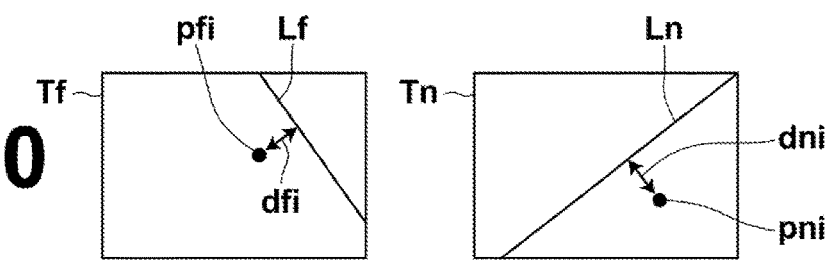
FIG. 10 is a diagram for explaining how distances of a pair of feature points from epipolar lines in intraoperative images are calculated.

Then, for the pairs of feature points for the selected eight points, distances $d_{fi}$ and $d_{ni}$ from the epipolar lines Lf and Ln on the intraoperative images Tf and Tn, respectively, are calculated according to the equations (4) and (5) below. The distances $d_{fi}$ and $d_{ni}$ for a pair of feature points $(p_{fi}, p_{ni})$ are as shown in FIG. 10. Subsequently, the second registration unit 24 calculates epipolar errors Err for the pairs of feature points for the eight points according to the equation (6) below (step ST14). As can be seen, the epipolar error Err is one having a greater value of the distances from the epipolar lines Lf and Ln for each pair of feature points.

$$d_{fi}=(a_{fi}\cdot x_{fi}+b_{fi}\cdot y_{fi}+c_{fi})^2/(a_{fi}^2+b_{fi}^2) \tag{4}$$

$$d_{ni}=(a_{ni}\cdot x_{ni}+b_{ni}\cdot y_{ni}+c_{ni})^2/(a_{ni}^2+b_{ni}^2) \tag{5}$$

$$\mathrm{Err}(p_{fi},p_{ni})=\max(d_{fi},d_{ni}) \tag{6}$$

Further, the second registration unit 24 calculates an evaluation value Vk for the selected eight pairs of feature points according to the equation (7) below (step ST15). It should be noted that, in equation (7), $f(\mathrm{Err}(p_{fi}, p_{ni}))$ is a function that results in a value of the priority level on the feature points forming the pair of feature points when the $\mathrm{Err}(p_{fi}, p_{ni})$ is not greater than a predetermined threshold value Th1, and results in a value of 0 when the $\mathrm{Err}(p_{fi}, p_{ni})$ is greater than the threshold value Th1. Thus, the evaluation value Vk is a sum of the values of $\mathrm{Err}(p_{fi}, p_{ni})$ that are not greater than the predetermined threshold value Th1.

$$V_k = \sum_{i=1}^{N} f(\mathrm{Err}(p_{fi}, p_{ni})) \tag{7}$$

The priority level is set on the feature points forming the pair of feature points with referencing the priority levels assigned to the associated image S0. Specifically, since the associated image S0 is registered with the intraoperative image Tf of the intraoperative images Tf and Tn, each pixel position on the intraoperative image Tf corresponds to a pixel position on the associated image S0 on a one-to-one basis. In this embodiment, each pixel of the associated image S0 has a priority level set thereon, and thus each pixel position on the intraoperative image Tf can be assigned with the priority level set on the corresponding pixel position of the associated image S0. Accordingly, the priority levels of the feature points set on the intraoperative image Tf are the priority levels of the corresponding pixel positions of the associated image S0. Then, the priority level of each feature point on the intraoperative image Tn paired with a corresponding feature point on the intraoperative image Tf is the priority level of the corresponding feature point on the intraoperative image Tf. Thus, one priority level is set on each pair of feature points.

In this embodiment, higher priority levels are set on the contour 40 of the liver, the resection line 41 along which is resection is conducted during the surgery, the boundary 42 of the area that appears on the surface of the liver, and the area of the liver that will be left after the resection. Accordingly, when the selected eight pairs of feature points include a pair of feature points corresponding to any of these positions, they have a higher evaluation value Vk.

The second registration unit 24 determines whether or not the evaluation value Vk is greater than a maximum value Vmax of the evaluation values calculated so far (step ST16). If the determination in step ST16 is affirmative, the evaluation value Vk is updated (step ST17), and whether or not the calculation of the evaluation value Vk has been repeated by a predetermined number of times a is determined (number of times of calculation of evaluation value=α; step ST18). The predetermined number of times is a statistically determined number of times, which allows detecting the optimal eight pairs of feature points at a certain probability (99.9%, for example) without performing round-robin matching on the pairs of feature points. If the determination in step ST16 is negative, the process proceeds to step ST18. If the determination in step ST18 is negative, new eight pairs of feature points are selected (step ST19), and the process returns to step ST13.

If the determination in step ST18 is affirmative, the second registration unit 24 determines a fundamental matrix F that is calculated using the eight pairs of feature points resulted in the maximum value Vmax of the current evaluation values as a fundamental matrix Fd for registration (step ST20). Further, the second registration unit 24 calculates an essential matrix E according to the equation (8) below, based on the fundamental matrix Fd for registration. In equation (8), "A" is a 3×3 matrix, which is called a "camera intrinsic matrix", and is obtained from information such as the focal length, the angle of view, and the optical axis point of the camera 14.

$$E^T = A^T \cdot Fd \cdot A \quad (8)$$

The essential matrix E can be expressed as E=t·R, where "t" is a vector representing a translation amount and a scaling amount, and "R" is a 3×3 matrix representing a rotation, and "t" and "R" are positional information representing a relative positional difference between the position of the camera 14 from which the intraoperative image Tf is obtained and the position of the camera 14 from which the intraoperative image Tn is obtained, that is, a relative positional difference between the intraoperative image Tf and the intraoperative image Tn, which is obtained after the intraoperative image Tf. Accordingly, the second registration unit 24 calculates the essential matrix E, and further calculates, from the essential matrix E, the vector t and the matrix R as the positional information (step ST21).

Figure 11:
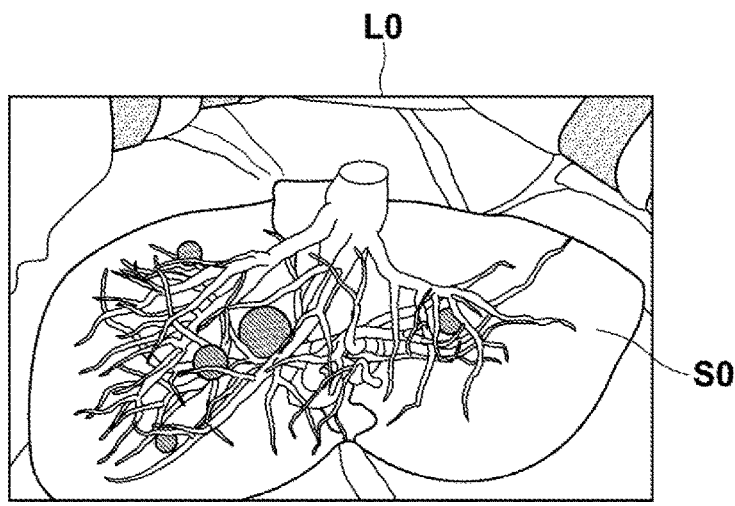
FIG. 11 is a diagram for explaining how an associated image is superimposed and displayed on an intraoperative live view.

The second registration unit 24 registers the associated image S0 with the intraoperative image Tn using the positional information (step ST22). Namely, the second registration unit 24 translates, rotates, and/or scales the associated image S0 based on the positional information such that the associated image S0 registered with the intraoperative image Tf is superimposed on the liver captured in the intraoperative image Tn. Then, the display control unit 25 superimposes and displays the associated image S0 on the thus registered intraoperative image Tn (step ST23), and the process returns to step ST11. By repeating this second registration, the associated image S0 is superimposed and displayed on the intraoperative live view L0 in the same positional relationship as that registered with the initial intraoperative image T0, as shown in FIG. 11.

As described above, in the first embodiment, the priority levels are set on pairs of feature points based on the associated image S0, the positional information indicating a relative positional difference between the intraoperative images Tf and Tn is obtained based on the pairs of feature points with the priority levels set thereon, and the associated image S0 is registered with the intraoperative image Tn based on the positional information. By setting the priority levels on feature points based on the associated image S0 in this manner, the positional information can be obtained using feature points with higher priority levels that are based on the associated image S0. The thus obtained positional information allows accurate registration between the intraoperative images Tf and Tn, and in turn, between the associated image S0 and the intraoperative image Tn.

Next, a second embodiment of the disclosure is described. The image registration device according to the second embodiment has the same configuration as that of the image registration device according to the first embodiment shown in FIG. 2, and the difference between them lies only in the operations to be performed, and therefore detailed description of the device of the second embodiment is omitted. Namely, the difference between the second embodiment and the first embodiment lies in that, in the second embodiment, the positional information is obtained using the initial intraoperative image T0 used in the initial registration and the newly obtained intraoperative image Tn every time a certain number of intraoperative images have been obtained.

Figure 12:
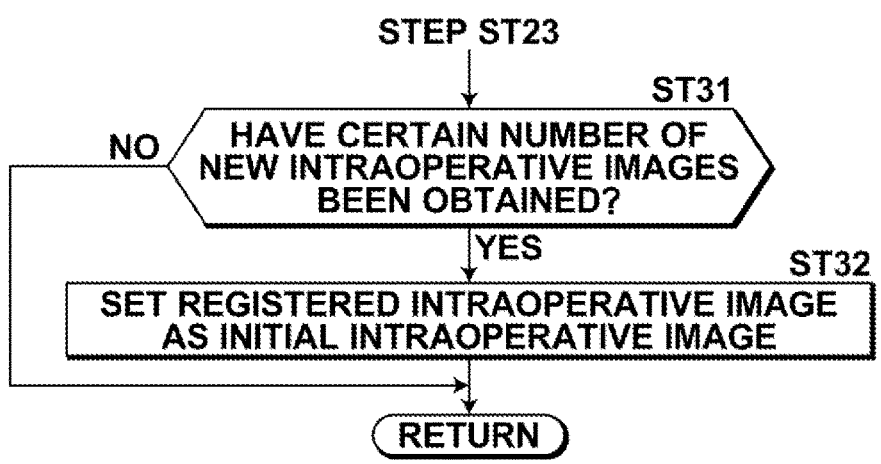
FIG. 12 is a flow chart showing operations performed in a second embodiment.

FIG. 12 is a flow chart showing the operations performed in the second embodiment. It should be noted that, in the following description, only operations in step ST23 and the following steps of the second embodiment, which are different from the operations in step ST23 and the following steps of the first embodiment shown in FIG. 7, are explained. In the second embodiment, the second registration unit 24 determines, next to step ST23, whether or not a certain number of new intraoperative images Tn have been obtained (step ST31). The certain number may be determined in advance by the surgeon. If the determination in step ST31 is negative, the process returns to step ST11. If the determination in step ST31 is affirmative, the registered intraoperative image Tf is set as the initial intraoperative image T0 (step ST32), and the process returns to step ST11. Thus, positional information based on the initial intraoperative image T0 and the new intraoperative image Tn is obtained, and the second registration between the associated image S0 and the intraoperative image Tn is performed.

If the registration is performed using only the newly obtained intraoperative image, a difference between the positional relationship between the associated image S0 and the newly obtained intraoperative image and the positional relationship between the associated image S0 and the initial intraoperative image T0 determined during the initial registration may gradually be increased, and the position of the associated image S0 may no longer be registered with the position of the liver captured in the newly obtained intraoperative image Tn. To address this problem, in the second embodiment, the positional information is obtained using the initial intraoperative image T0 used in the initial registration and the newly obtained intraoperative image Tn every time the certain number of intraoperative images have been obtained. In this manner, the registration between the associated image S0 and the newly obtained intraoperative image Tn can be restarted from the state of the first registration using the positional information obtained from the initial intraoperative image T0 and the newly obtained intraoperative image Tn, and thus the second registration can be continued in a more accurate manner.

In the above-described embodiments, the initial intraoperative image T0 may be used as the registered intraoperative image Tf. In this case, the second registration between the associated image S0 and the newly obtained intraoperative image Tn can be performed without losing the positional relationship between the associated image S0 and the initial intraoperative image T0 determined during the initial registration.

Further, although a projection image of the liver extracted from the three-dimensional image V0 generated by a modality, such as a CT apparatus, is used as the associated image S0 in the above-described embodiment, this is not intended to limit the disclosure, and a functional three-dimensional image which is obtained through PET scanning or nuclear medicine scanning may be used as the associated image. Further, as the associated image S0, an image of a symbol, such as an arrow, or an image of text information, such as the names of sites and tissues around the resection position, may also be used.

Although the initial intraoperative image T0 is displayed on the display 15 and the first registration of the associated image S0 is performed manually by the operator in the above-described embodiments, the initial registration between the associated image S0 and the liver captured in the initial intraoperative image T0 may be automatically performed.

Further, although the associated image S0 is used during the first registration in the above-described embodiments, only the contour of the liver included in the associated image S0 may be extracted as a boundary image, and the boundary image may be used to perform the first registration.

Still further, although the associated image S0 is displayed on the tablet terminal with being superimposed on the intraoperative live view L0 in the above-described embodiments, the disclosure is also applicable to registration of the associated image S0 in a case where the intraoperative live view L0 is displayed on a head-mount display. The disclosure is also applicable to registration of the associated image S0 in a case where the intraoperative live view L0 is taken with a camera disposed above the surgical table, and the taken image is displayed on a display device inside or outside the surgery room. In this case, the image registration device 1 according to this embodiment is installed on a computer, and the registration between the intraoperative live view L0 and the associated image S0 is performed on the computer. Then, the intraoperative live view L0 and the associated image S0 superimposed thereon are displayed on the head-mount display and the display device connected to the computer.

Further, the disclosure is also applicable to registration between the intraoperative live view L0 and the associated image S0 in the cases where the associated image S0 is displayed on the intraoperative live view L0 imaged with a laparoscope, or the intraoperative live view L0 for robotic surgery.

Although the associated image S0 is generated by the associated image obtaining unit 22 in the above-described embodiments, the associated image S0 may be generated by an associated image generating unit that is provided separately from the image registration device 1. In this case, the associated image obtaining unit 22 need not be capable of generating the associated image S0, and the configuration of the image registration device 1 can be simplified.

Although the first registration is performed by translating, rotating, scaling, and changing the orientation of the associated image S0 in the above-described embodiments, associated images oriented in various directions may be prepared in advance, and the first registration may be performed with selecting one of the associated images with an orientation that most matches the orientation of the surgical site captured in the intraoperative live view L0 during the first registration.

Although the hepatic artery, etc., included in the liver are extracted and included in the associated image S0 in the above-described embodiments, only the liver, which is the surgical site, may be extracted, and an image representing only the three-dimensional shape of the liver may be used as the associated image S0.

Although the liver is used as the surgical site in the above-described embodiment, this is not intended to limit the disclosure, and the disclosure is applicable to any surgical site in the case where the associated image S0 is displayed with being registered and superimposed on the intraoperative live view L0.

Now, advantageous effects of the embodiments of the disclosure are described.

In the case where each of a plurality of feature points corresponding to one another are weighted according to the priority levels, a certain number of feature points used to obtain the positional information are selected from the feature points corresponding to one another, and the positional information is obtained based on the selected certain number of feature points, the positional information can be obtained using feature points that are more appropriate for the registration with the associated image. Using the thus obtained positional information allows more accurate registration between the registered intraoperative image and the newly obtained intraoperative image, and in turn, more accurate registration between the associated image and the newly obtained intraoperative image.

In the case where each position on the associated image has a priority level set thereon, and priority levels are set on the feature points with referencing the priority levels set on the associated image, the positional information can be obtained using feature points that are more appropriate for the registration with the associated image. Using the thus obtained positional information allows more accurate registration between the registered intraoperative image and the newly obtained intraoperative image, and in turn, more accurate registration between the associated image and the newly obtained intraoperative image.

In the case where higher priority levels are set on more characteristic positions of the surgical site on the associated image, using the thus obtained positional information allows more accurate registration between the registered intraoperative image and the newly obtained intraoperative image, and in turn, more accurate registration between the associated image and the newly obtained intraoperative image.

If the registration is performed using only the newly obtained intraoperative image, a difference between the positional relationship between the associated image and the newly obtained intraoperative image and the positional relationship between the associated image and the intraoperative image determined during the initial registration may gradually be increased, and the position of the associated image may no longer be registered with the newly obtained intraoperative image. In the case where the positional information is obtained using the intraoperative image used in the initial registration and the newly obtained intraoperative image every time a certain number of intraoperative images have been obtained, the registration between the associated image and the newly obtained intraoperative image can be restarted from the state of the first registration using the positional information obtained from the intraoperative image used in the initial registration and the newly obtained intraoperative image. Thus, the second registration can be continued in a more accurate manner.

In the case where the intraoperative image used in the initial registration is used as the registered intraoperative image, the registration between the associated image and the newly obtained intraoperative image can be performed without losing the positional relationship between the associated image and the initial intraoperative image determined during the initial registration.

What is claimed is:

1. An image registration device comprising:
   an image obtaining unit configured to obtain an intraoperative live view comprising two or more intraoperative images taken at different times, the intraoperative live view capturing a surgical site in a human body undergoing a surgery;
   an associated image obtaining unit configured to obtain an associated image associated with the surgery of the surgical site; and
   a registration unit configured to perform registration between the intraoperative live view and the associated image,
   wherein the registration unit extracts a plurality of feature points corresponding to one another from a registered intraoperative image having been registered with the associated image and a newly obtained intraoperative image, sets priority levels on the feature points corresponding to one another based on the associated image, obtains positional information indicating a relative positional difference between the registered intraoperative image and the newly obtained intraoperative image based on the feature points with the priority levels set thereon, and performs registration between the associated image and the newly obtained intraoperative image based on the positional information.

2. The image registration device as claimed in claim 1, further comprising a display control unit configured to superimpose the associated image on the intraoperative live view and display the associated image superimposed on the intraoperative live view on a display unit during the registration.

3. The image registration device as claimed in claim 1, wherein the registration unit weights each of the feature points corresponding to one another according to the priority level, selects, from the feature points corresponding to one another, a certain number of feature points used to obtain the positional information, and obtains the positional information based on the selected certain number of feature points.

4. The image registration device as claimed in claim 1, wherein the priority level is set on each position on the associated image, and the registration unit sets priority levels on the feature points corresponding to one another with referencing the priority levels on the associated image.

5. The image registration device as claimed in claim 4, wherein a higher priority level is set on a more characteristic position of the surgical site on the associated image.

6. The image registration device as claimed in claim 4, wherein, if the associated image includes a line representing a resection position of the surgical site, a higher priority level is set on a position in the vicinity of the line.

7. The image registration device as claimed in claim 4, wherein, if the associated image includes a line representing a resection position of the surgical site, a higher priority level is set on a position that will be left after resection along the line.

8. The image registration device as claimed in claim 1, further comprising an initial registration unit configured to perform initial registration between the intraoperative live view and the associated image,
   wherein the registration unit performs the registration based on the result of the initial registration.

9. The image registration device as claimed in claim 8, wherein the registration unit performs the registration between the intraoperative image used in the initial registration and the newly obtained intraoperative image every time a certain number of the intraoperative images have been obtained.

10. The image registration device as claimed in claim 8, wherein the registration unit uses the intraoperative image used in the initial registration as the registered intraoperative image.

11. The image registration device as claimed in claim 1, wherein the associated image comprises an image representing a three-dimensional shape of the surgical site.

12. An image registration method comprising the steps of:
    obtaining an intraoperative live view comprising two or more intraoperative images taken at different times, the intraoperative live view capturing a surgical site in a human body undergoing a surgery;
    obtaining an associated image associated with the surgery of the surgical site; and
    performing registration between the intraoperative live view and the associated image, the performing registration comprising:
    extracting a plurality of feature points corresponding to one another from a registered intraoperative image having been registered with the associated image and a newly obtained intraoperative image,
    setting priority levels on the feature points corresponding to one another based on the associated image,
    obtaining positional information indicating a relative positional difference between the registered intraoperative image and the newly obtained intraoperative image based on the feature points with the priority levels set thereon, and
    performing registration between the associated image and the newly obtained intraoperative image based on the positional information.

13. A non-transitory recording medium with an image registration program recorded thereon, the image registration program causing a computer to execute the steps of:
    obtaining an intraoperative live view comprising two or more intraoperative images taken at different times, the intraoperative live view capturing a surgical site in a human body undergoing a surgery;
    obtaining an associated image associated with the surgery of the surgical site; and
    performing registration between the intraoperative live view and the associated image, the performing registration comprising:
    extracting a plurality of feature points corresponding to one another from a registered intraoperative image having been registered with the associated image and a newly obtained intraoperative image,
    setting priority levels on the feature points corresponding to one another based on the associated image, obtaining positional information indicating a relative positional difference between the registered intraoperative image and the newly obtained intraoperative image based on the feature points with the priority levels set thereon, and performing registration between the associated image and the newly obtained intraoperative image based on the positional information.

* * * * *